March 26, 1963 C. M. HELLER 3,082,795
TORSIONAL PIPE COUPLINGS
Filed May 10, 1960 2 Sheets-Sheet 1
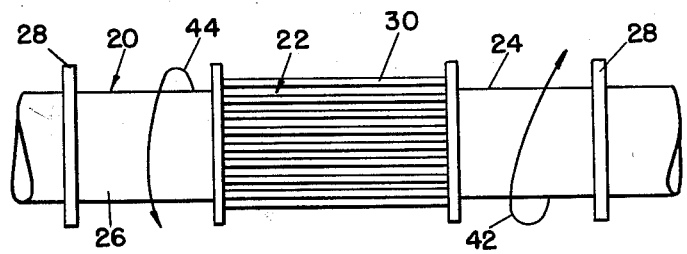
Fig. 1
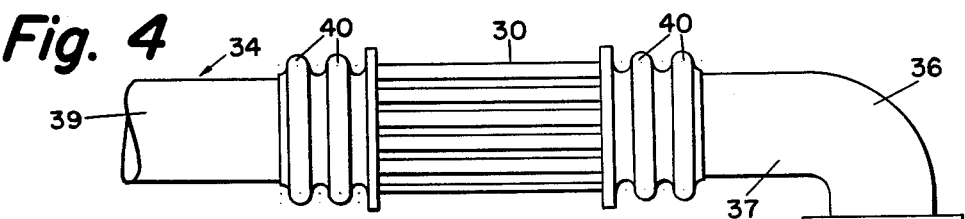
Fig. 4
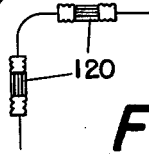
Fig. 12
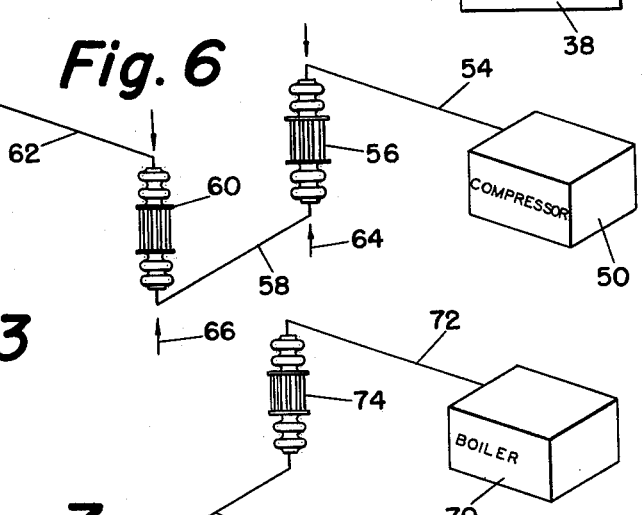
Fig. 6
Fig. 13
Fig. 7
Fig. 14  Fig. 15
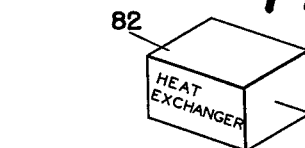
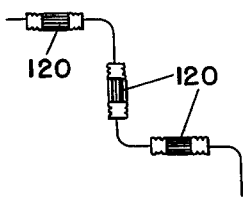
Fig. 16
INVENTOR
CHESTER M. HELLER
BY
*Caesar and Rivise*
ATTORNEYS March 26, 1963  C. M. HELLER  3,082,795
TORSIONAL PIPE COUPLINGS
Filed May 10, 1960  2 Sheets-Sheet 2
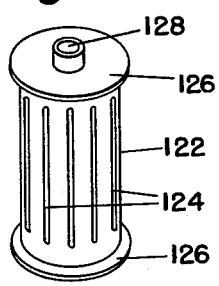
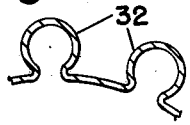
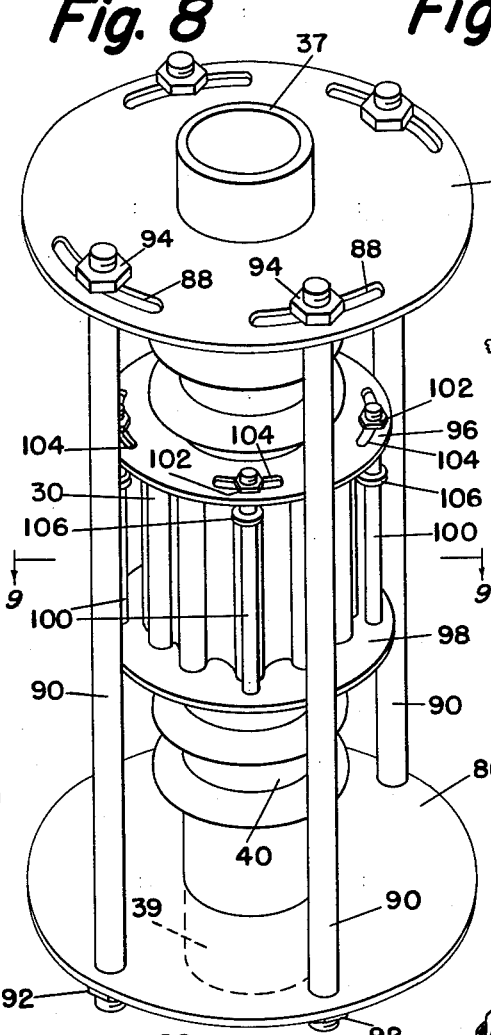
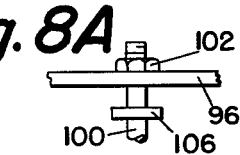
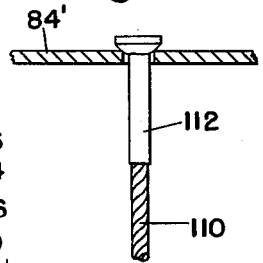
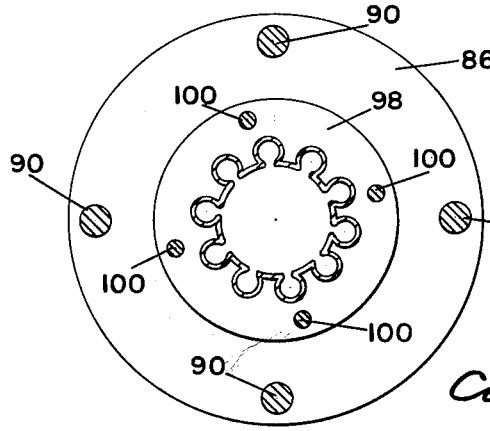
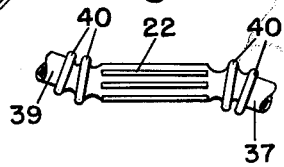
INVENTOR
CHESTER M. HELLER
BY
Caesar and Rivise
ATTORNEYS.

United States Patent Office 3,082,795
Patented Mar. 26, 1963

3,082,795
TORSIONAL PIPE COUPLINGS
Chester M. Heller, 2411 N. 54th St., Philadelphia 31, Pa.
Filed May 10, 1960, Ser. No. 28,060
4 Claims. (Cl. 138—121)

This invention relates to pipe couplings, and particularly to pipe couplings that function dynamically and elastically to absorb torsional forces applied to pipe.

A pipe joint used in fluid piping systems for absorbing or yielding to torsional forces is known as a swivel joint.

Customarily, such swivel joints absorb the dynamic rotations produced by vibrations in a piping system or by expansion and contraction thereof. A swivel joint has been formed of two ring-like mating surfaces that rotate relatively about their axis by sliding of the surfaces or by revolving on rollers. These joints generally employ some form of packing material to retain pressure and prevent leakage. Such joints require periodic replacement of the packing. Moreover, they are incapable of any axial deflection due to longitudinal compression or elongation nor of any lateral or shear displacement.

This invention has as its object to provide a new and improved pipe coupling for absorbing torsional forces and displacements.

Another object of this invention is to provide a new and improved torsional pipe coupling that does not require a packing and is otherwise maintenance free.

Another object of this invention is to provide a new and improved trosional pipe coupling that is capable of longitudinal deflection.

Another object of this invention is to provide a new and improved torsional pipe coupling that is capable of lateral displacement and angular deflection.

Another object of this invention is to provide a new and improved torsional pipe coupling that is adapted for general usage.

In accordance with this invention a torsional pipe coupling includes a section of straight pipe having a plurality of longitudinal corrugations formed around the periphery of the pipe. Due to these corrugations, the section of pipe is yieldable to torsional forces though generally rigid to transverse deflecting forces.

A feature of this invention is the arrangement with a longitudinally corrugated pipe section of means for absorbing longitudinal deflections of the pipe. Another feature is the use of means for limiting the longitudinal deflection of the pipe.

The foregoing and other objects and features of this invention, as well as the invention itself both as to its organization and mode of operation may be better appreciated from the following description when read together with the accompanying drawing, in which:

FIG. 1 is a side elevation of a torsional pipe coupling embodying this invention;

FIGS. 2 and 3 are fragmentary sectional views of corrugations of the pipe of FIG. 1;

FIG. 4 is a side elevation of a modification of the embodiment of FIG. 1 and incorporating an arrangement for absorbing longitudinal deflections;

FIG. 5 is a reduced side elevation of the coupling of FIG. 4 in a different condition;

FIG. 6 is a schematic diagram of a piping system incorporating torsional pipe couplings embodying this invention;

FIG. 7 is a schematic diagram of another piping system incorporating this invention;

FIG. 8 is a perspective view of a modification of the embodiment of FIG. 3 and incorporating an arrangement for limiting longitudinal deflections;

FIG. 8A is a fragmentary enlarged side elevational view of a portion of FIG. 8;

FIG. 9 is a sectional view taken on the line 9—9 of FIG. 8;

FIG. 10 is a fragmentary side view partly in section of a modification of FIG. 8;

FIG. 11 is a sectional end view of a multiple-ply tubing construction;

FIGS. 12 through 16 are schematic views of different piping configurations using this invention, and FIG. 17 is a perspective view of another modification of the device of FIG. 8.

In the drawing, corresponding parts are referenced by the same numerals.

In FIG. 1, a straight section 20 of cylindrical pipe includes a central portion 22 and end portions 24 and 26. The ends 24 and 26 are smooth surfaced and include coupling flanges 28 for attachment to the flanges of adjoining pipe. The ends 24 may also be terminated in coupling joints other than flanges, such as, for example, a simple welding joint. Corrugations 30 are formed in the central portion 22; they are generally the same and extend longitudinally or axially of the pipe. A plurality of the corrugations 30 are formed around the periphery; they may assume various forms, such as, for example, a U-shaped corrugation 30 (FIG. 2) or a toroidal-shaped corrugation 32 (FIG. 3). Reinforcing bars (not shown) inside and/or outside of the longitudinal corrugations 30 in FIG. 2 may be employed for the purpose of reinforcing light wall bellows and provide better distribution of stresses. Likewise in FIG. 3 reinforcing bars or pipe segments (not shown) may be employed. The pipe 20 may be other than circular in cross-section and is formed of suitable materials, such as aluminum, iron, brass, copper, to provide a generally rigid structure except for the torsional characteristic to be described hereinafter.

In FIG. 4, a pipe section 34 includes a straight portion with longitudinal or axial corrugations 30 that is shown, by way of illustration, with one smooth end 37 having an elbow 36 terminating in a flange 38 or other suitable joint. The other smooth end 39 of the section may also be an elbow (not shown) or may terminate in a straight end joint. The straight portion of the pipe 34 includes a plurality of corrugations 40 at each end of the axial corrugations 30. The corrugations 40 are formed to transverse the axial corrugations 30. These corrugations 40 are annular shaped and extend around the pipe's periphery. In cross-section, they may be similar to the corrugations 30 or 32.

The pipe sections of FIGS. 1 and 4 function as torsional pipe couplings. That is, when the ends 24 and 26 of pipe 20 are twisted in opposite directions, as indicated by the arrows 42, 44 a distortion occurs in the pipe that assumes the form of the corrugations 30 closing somewhat. This distortion is similar but in the opposite direction for twisting forces in the reverse direction. This distortion, it has been found, is non-injurious and reversible. It is a predictable distortion, and the force required to accomplish the torsional rotation of the corrugations 30 is measurable and consistent. The forces required to twist the corrugations 30 are very much less than those that would be necessary to similarly twist the uncorrugated pipe portions 24 and 26 made of the same material. Moreover, any torque sufficient to twist the pipe ends 24, 26 would force an unpredictable injurious distortion thereon. Thus, in use, the corrugated portion 22 operates to absorb twisting forces applied to the ends of the pipe, and the ends 24, 26 themselves remain unimpaired by the twisting.

When the corrugated section 22 is twisted, the effective length of the section 22 decreases. When untwisted, the section 22 is restored in length. These variations in length may be absorbable by the piping system in which the torsional pipe coupling is used, and the form of the invention illustrated in FIG. 1 would be suitable in such a system. However, where the axial deflections of the pipe due to changes in effective length of the corrugations are not readily absorbed by the system, the embodiment of FIG. 4 would be used. The transverse corrugations 40 operate as a bellows to expand and contract with the forces tending to produce axial deflections. This expansion and contraction compensates the changes in length of the axial corrugations without interfering with their torsional function. The torsion does not affect the transverse corrugations 40, which are effectively rigid pipe to such forces.

The number and size of the transverse corrugations 40 are chosen in accordance with the axial deflections that are to be compensated. Additional factors in this design may be other functions served by the corrugations 40. That is, these corrugations 40 yield to angular deflections and may be designed to accommodate such deflection in addition. The two sets of transverse corrugations 40 also permit accommodation of lateral deflections as illustrated in FIG. 6. That is, similar angular deflections of the sets of transverse corrugations 40 maintains the ends 37, 39 parallel but displaced. This function of the transverse corrugations 40 to accommodate angular and lateral deflections is effective for both dynamic and static deflections.

A piping system employing the torsional pipe coupling of this invention is illustrated schematically in FIG. 6. The piping is shown connected between a compressor 50 and an after cooler 52. The compressor 50 is connected by a section 54 of pipe to a torsional pipe coupling 56 of the type shown in FIG. 4. The coupling 56 is connected via pipe 58 to another coupling 60 of the same type, which is connected via pipe 62 to the after cooler. The couplings 56 and 60 have elbows (like elbow 36) at each end but oriented at right angles to accommodate the perpendicular piping 54, 58, 62. Pairs of anchors 64 and 66 prevent vertical elongation of the couplings 56, 60, but permit sliding movement of the piping 54, 58, 62 in all directions; suitable anchors are well known.

In operation, fluids at varying temperatures are piped between the compressor 50 and after cooler 52. These temperature variations produce expansion and contraction of the piping 54, 58, 62. In addition, vibration of the equipment also produces movement of the pipe. These movements may be considered in simple form as an expansion of the piping 54 to the left (as viewed in FIG. 6). This expansion of the piping 54 tends to apply a force through pipe coupling 56 to one end of piping 58 to rotate that piping 58 around pipe coupling 60. Thus, the latter coupling 60 is twisted. The resulting shortening of the axial corrugations 30 is compensated by opening of the transverse corrugations 40. In a similar manner, torques may be applied to coupling 56, and accommodated there in the manner described above. The movements and resulting torques of the piping 54, 58, 62 are, in practice, quite complex. However, the torques can all be absorbed by the use of torsional pipe couplings wherever they occur.

The anchors 64, 66 prevent elongation of the couplings 56, 60 when pressure is applied within the piping. Thus, the overall lengths of the pipe couplings 56, 60 are constrained, but without interference to the transverse corrugations to accommodate for changes in length of the axial corrugations.

In FIG. 7, another piping system is illustrated in which a boiler 70 is connected via piping 72, torsion coupling 74, piping 76, torsion coupling 78, and piping 80 to a heat exchanger 82. The general layout of the piping of FIG. 7 is similar to that of FIG. 6, except that in the latter the terminal equipments are shown to be at the same level, while, in FIG. 7, they are displaced by the combined lengths of the coupling legs 74, 78. The operation of FIG. 7 is similar to that described above for FIG. 6, except for the absence of restraining anchors in FIG. 7, where such anchors may not be feasible.

To provide a limit-stop device in the couplings 74, 78 themselves, a construction shown in FIGS. 8 and 9 is employed. The longitudinal corrugations 30 and the lateral corrugations 40 are the same as described for FIG. 4, and the smooth ends 37 and 39 are straight and suitable for welding to adjoining pipe. Attached to the ends 37 and 39, by welding or the like, are circular collars 84 and 86, respectively, that have aligned apertures spaced around the edges, the apertures 88 in the collar 84 being circular slots that are co-axial with the pipe 37. A plurality of threaded tie rods 90 are fixedly mounted in the apertures of collar 86 by means of nuts 92 bearing the outside thereof. The tie rods 90 are slidable in the slots 88 with a limit stop provided by the nuts 94 bearing against the collar 84.

A second pair of collars 96, 98 are fixed to the pipe between the transverse and longitudinal corrugations 40 and 30 so as to bracket the latter 30. A second set of threaded tie rods 100 are secured between apertures in the collars 96 and 98 by nuts 102. The circular apertures 104 in the collar 96 are elongated and co-axial to permit sliding movement of the rods 100. In addition, a shoulder 106 may be formed on each of the tie rods 100 normally spaced from the inside surface of the collar 96 but adapted to engage therewith upon shortening of the effective length of the axially corrugated section.

In operation, the pipe end 37 may rotate with respect to the end 39; the torsional effects are accommodated in the axial corrugations in the manner described above. The tie rods 90 do not interfere with this rotation over a range determined by the length of the slots 88; beyond that, these rods provide an overall limit stop for the extremes of relative rotation of the pipe ends 37 and 39. The tie rods 90 also provide a limit stop for expansion of the bellows 40 and by the nuts 92, 94 bearing against the collars 84, 86 permit a settable, limited amount of expansion of the bellows from a normal unexpanded condition.

The rods 100 bracket the axial corrugations 30 and cooperate with the slots 104 to permit a predetermined range of rotation of those corrugations. Thus, the tie rods 100 function as torsion limit stops that are positioned directly between the two points of relative rotation of the pipe coupling. These tie rods 100 may be used as a supplement in this function to the tie rods 90; also, the tie rods 100 may be used as a torsion limit stop where the rods 90 are not provided.

The shoulders 106 on the tie rods may be used as a stop to prevent buckling of the axial corrugations 30 in case of some extreme condition causing a failure of the corrugations. The shoulder stop 106 is positioned at about the extreme shortened position of the corrugations and therefore also acts in effect as a torsional limit stop.

Other limiting devices may be used in place of the tie rods 90 or 100. In FIG. 10, a fragment of an alternative expansion limiter is shown. A flexible cable 110 is attached to an apertured collar 84' (similar to collar 84 except that the apertures are not slotted) by means of a headed fastener 112 such as a rivet. The cable 110 is similarly attached at its lower end to collar 86. A plurality of these cables 110 used in place of the tie rods 90 provide an expansion limit stop and, yet, permit rotation of the pipe coupling.

In design of the longitudinal corrugations, the amount of torsional rotation is governed and limited by the number of corrugations, the width of gap within each corrugation, and the overall effective length of the corrugation. The angle of torsional rotation is determined by the ratio of gap to effective length. Thus, for example, if it is desired to have the torsional pipe coupling twisted through 45° of rotation about its center, the section can be made up of thirty corrugations, each have a gap of about one-eighth inch and an effective length of about five inches. If one-half the resultant stress is desired on the axial corrugations for the same gap, the length and number of the corrugations must both be doubled.

In constructing the corrugations, various techniques may be used. The corrugations may be made in preformed tubing, separately for the axial and transverse corrugations, and the two sections welded together and to the smooth pipe sections. Alternatively, both corrugations may be pressed into sheet material and then rolled and seamed for a unitary piping. The torsional force required to twist the corrugations is reduced as the wall thickness is reduced. Thus, the piping may be in a multiple-ply construction, that is, made up of several layers 114 spirally wrapped together on a mandrel and seamed longitudinally by a weld 116 as indicated in FIG. 11. Alternatively, several concentric layers of tubing formed to nest closely together may be used. The multiple-ply section functions as a single wall pipe in that the aggregate plies equal in pressure retention that of a single wall of equal thickness. However, the multiple-ply construction has considerably more flexibility and resiliency than the single wall pipe.

The corrugations may be formed internally (concave) as well as externally or convex. Moreover, the axial corrugations may be formed somewhat in a spiral where appearance may make it attractive. However, for such purposes, a spiral of only a few degrees off-axis would be tolerable, because generally such spiral is not available for accommodation of torques.

This invention may be fabricated in different configurations as shown in FIGS. 12–16: In FIG. 12, an elbow with torsional pipe couplings 120 in each leg; in FIGS. 13–15, all coupling with the torsional couplings 120 in the cross-arm, or in the legs, or in both; in FIG. 16 with the torsional pipe couplings in each arm of an S pipe.

Another limiting device which may be used in place of tie rods 90 or 100 is shown in FIG. 17. This device indicated by numeral 122 is a section of tubing having longitudinal slots 124 formed in its lateral wall. Flanges 126 may be welded to limiting device 126 at its ends and the entire unit is secured to conduit 128.

Other forms of this invention will be apparent from the foregoing descriptions. The descriptions of specific forms of the invention is not intended as a limitation on the scope of the invention.

Thus, from the foregoing description, it is seen that a new and improved torsional pipe coupling is provided. No packing is required for this coupling, and in addition to the torsional deflections, accommodation of axial, annular, and lateral deflections is available.

What is claimed as the invention is:

1. A torsional pipe coupling comprising a generally circular, unitary, jointless conduit wall construction including torsional force yielding means, expansion force yielding means and contraction force yielding means, said means joined in continuous end to end relation, said torsional force yielding means incorporating a plurality of longitudinal, peripheral corrugations extending between said expansion and contraction force yielding means, said contraction force yielding means incorporating a plurality of transverse, annular corrugations and said expansion force yielding means incorporating a plurality of transverse annular corrugations.

2. The invention of claim 1 wherein said longitudinal corrugations are of toroidal configuration in cross section.

3. The invention of claim 1 wherein said conduit wall construction includes a multiplicity of laminated plies in continuous face of face contact forming said circular conduit.

4. A torsional pipe coupling comprising a length of conduit including a centrally positioned, torsional force yielding means having open ends, expansion force and contraction force yielding means extending from each said end in lateral juxtaposition thereto, all of said means respectively joined by smooth, stress-free transition pieces therebetween; said torsional force yielding means comprising a plurality of longitudinal corrugations, said corrugations having equal dimensions and extending longitudinally along the length of said conduit; said expansion force yielding means comprising a plurality of transverse corrugations, said corrugations having equal dimensions and arranged transverse to the longitudinal axis of said coupling; said contraction force yielding means comprising a plurality of transverse corrugations, said transverse corrugations being similar to the said expansion force yielding means whereby a single, unitary, low-stress torsional pipe coupling is formed.

References Cited in the file of this patent

UNITED STATES PATENTS

| | | |
|---|---|---|
| 401,706 | Legat | Apr. 16, 1889 |
| 724,675 | Decker | Apr. 7, 1903 |
| 2,127,627 | Goddark | Aug. 23, 1938 |
| 2,335,478 | Bergman | Nov. 30, 1943 |
| 2,857,175 | Browning | Oct. 21, 1958 |
| 3,006,662 | Katsuhara | Oct. 31, 1961 |